(12) United States Patent
Krone et al.

(10) Patent No.: US 7,140,170 B2
(45) Date of Patent: Nov. 28, 2006

(54) DEVICE AND METHOD FOR MEASURING AND CONTROLLING BALE LENGTH

(75) Inventors: Bernard Krone, Spelle (DE); Klaus Martensen, Horstel (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 128 days.

(21) Appl. No.: 10/708,787

(22) Filed: Mar. 25, 2004

(65) Prior Publication Data

US 2004/0187468 A1 Sep. 30, 2004

(30) Foreign Application Priority Data

Mar. 26, 2003 (DE) ................. 103 13 492

(51) Int. Cl.
*A01D 39/00* (2006.01)
(52) U.S. Cl. .................................. 56/341; 56/343
(58) Field of Classification Search ............... 56/341, 56/343; 701/50
See application file for complete search history.

(56) References Cited

U.S. PATENT DOCUMENTS

| | | | | |
|---|---|---|---|---|
| 2,030,031 A | * | 2/1936 | Innes | 100/4 |
| 3,916,778 A | * | 11/1975 | Van Doorn et al. | 100/4 |
| 4,106,267 A | * | 8/1978 | White | 56/1 |
| 4,526,094 A | * | 7/1985 | Rewitzer | 100/35 |
| 4,729,301 A | * | 3/1988 | Smith et al. | 100/43 |
| 4,803,832 A | * | 2/1989 | Crawford | 56/341 |
| 4,833,866 A | * | 5/1989 | Newton et al. | 53/529 |
| 4,930,411 A | * | 6/1990 | Naaktgeboren | 100/4 |
| 5,782,175 A | * | 7/1998 | Schrag | 100/4 |
| 6,134,870 A | * | 10/2000 | Lippens et al. | 56/432 |
| 6,651,416 B1 | * | 11/2003 | Trelstad et al. | 56/341 |
| 6,708,478 B1 | * | 3/2004 | Mesmer et al. | 56/343 |

FOREIGN PATENT DOCUMENTS

DE 38 09 132 5/1989

* cited by examiner

*Primary Examiner*—Thomas B. Will
*Assistant Examiner*—Alicia Torres
(74) *Attorney, Agent, or Firm*—Gudrun E. Huckett

(57) ABSTRACT

A device for determining and controlling a bale length on a pick-up baler for agricultural harvested material has a pick-up device, a feed channel connected to the pick-up device, and a pressing channel with pressing piston connected to the feed channel. A conveying device conveys the harvested material through the feed channel into the pressing channel. The pressing piston compacts the harvested material. A sensor detects a bale growth resulting upon compression of the harvested material during the feed stroke from the feed channel into the pressing channel. An electronic evaluation device is connected to the sensor that supplies a bale growth value to the electronic evaluation device where it is converted into an averaged operand or a statistical operand for determining a required number of feed strokes for reaching the nominal bale length. After the computed number of feed strokes is reached, the binding device is triggered for tying the finished bale.

9 Claims, 1 Drawing Sheet

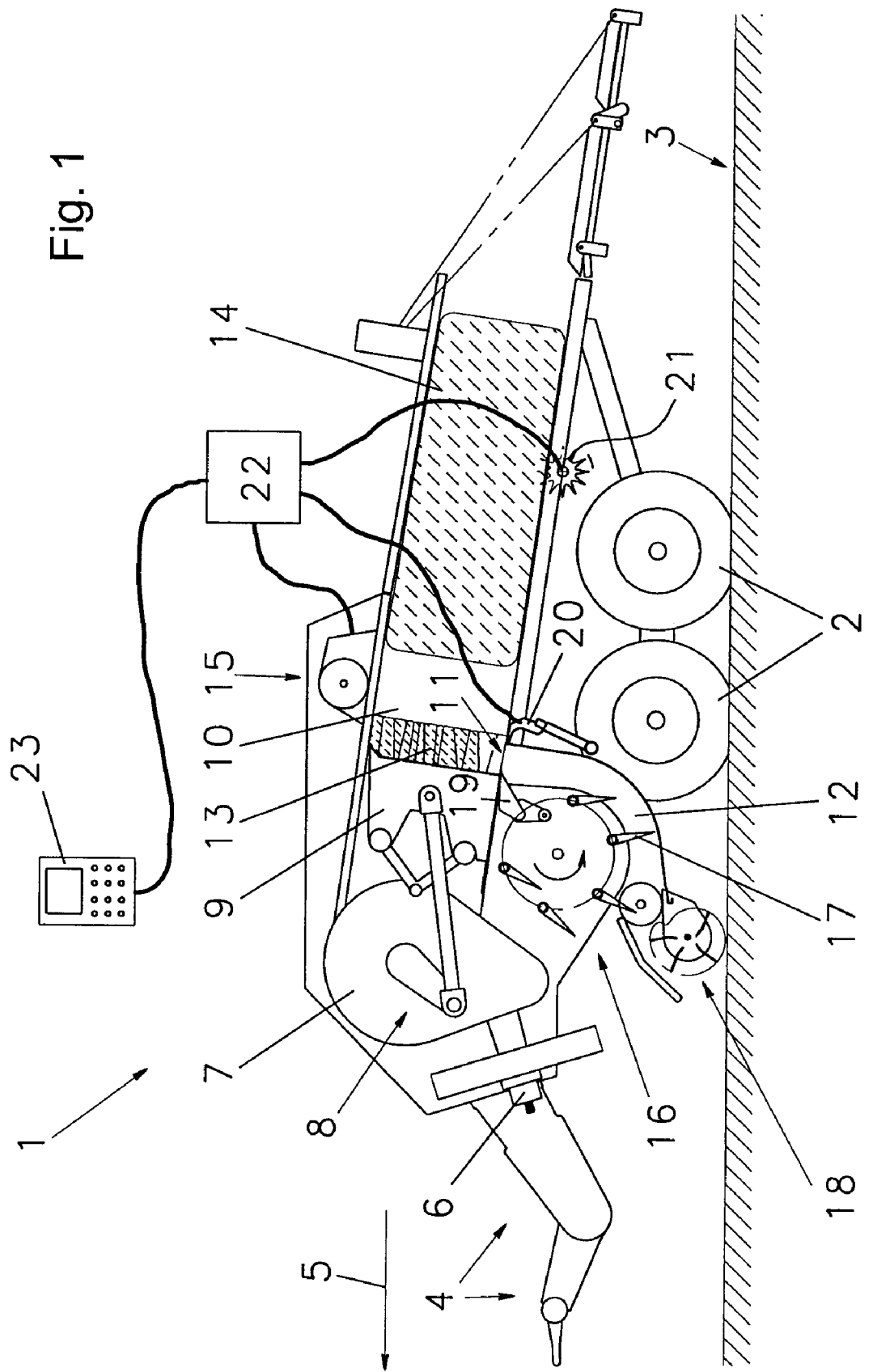

DEVICE AND METHOD FOR MEASURING AND CONTROLLING BALE LENGTH

BACKGROUND OF INVENTION

1. Field of the Invention

The invention relates to a device and a method for determining and controlling the bale length on a pick-up baler for agricultural harvested material, wherein the device comprises a pick-up device, a conveying device, with or without cutting device, arranged downstream of the pick-up device for conveying the harvested material to a feed channel, a conveying action for the harvested material that is controlled as a function of the degree of filling of the feed channel for conveying the harvested material from the feed channel into a pressing channel by means of a feed stroke, a pressing piston arranged within the pressing channel and movable in a reciprocating fashion for compacting the harvested material, as well as a tying device for tying the finished bale with tying material.

2. Description of the Related Art

Such pick-up balers are used to generate primarily rectangular large-size, high-density bales of stalk material. It is particularly important in this connection that a uniform preset bale length is maintained for transport and storage of the bales and for a possible precise determination of the harvest yield.

Several patent applications with proposed solutions for different devices for determining the bale length are known. In most cases, the length is determined by means of a measuring wheel that is embodied as a thumb wheel and is driven by the moving bale; it measures the bale length directly by a mechanical device or an electronic sensor connected thereto. After reaching a preset nominal value, the tying of the bale is triggered. In all these measuring devices, the precision of repeated measurements of the bale length is however unsatisfactory. Many factors regarding the material properties lead to different bale properties and behavior. In particular, the density of the harvested material and the restoring expansion of the bale have an effect on the measuring results because of slip and reverse rotation of the measuring wheel. A further imprecision of this bale length measurement action re-sides in that a bale growth is assumed for the last piston stroke of a bale that is triggered after the tying action has been initiated. However, this stroke, depending on the degree of filling of the pressing chamber, can actually vary extremely and, therefore, the bale length can vary also.

In the solution proposed in German patent 38 09 132 C1 for measuring the bale length, the aforementioned disadvantages of the direct length sensing on the bale by means of a measuring wheel are circumvented in that the stroke length of the pressing piston is used as a parameter for determining the bale length. In this connection, it is assumed that with each stroke of the pressing piston the achieved bale growth represents a constant value so that, based on this growth value per stroke and the number of strokes of the pressing piston, the precise length of a bale can be determined. Since the bale growth per pressing piston stroke is only a theoretical value and since it is known in practice that harvested materials to be processed cannot be compacted to the same degree, this method of measuring the bale length is also not precise enough.

SUMMARY OF INVENTION

It is an object of the present invention to provide a device and a method for measuring and controlling the bale length of a pick-up baler of the aforementioned kind that ensures that a preset bale length is maintained as precisely as possible.

In accordance with the present invention, this is achieved in connection with the device of the aforementioned kind in that the bale growth which results upon compression of the harvested material for each feed stroke from the feed channel into the press channel, is detected by at least one sensor and a signal correlated with the bale growth is supplied from the sensor to an electronic evaluation device, wherein this signal is convertible into an averaged or operand and/or statistical operand, which operand is used for determining the required number of feed strokes for approximately reaching the preset nominal bale length and, after completion of the computed nominal number of feed strokes, triggers the binding device.

In accordance with the present invention, this is achieved for the method of the aforementioned kind in that for each feed stroke of the harvested material from the feed channel into the pressing channel and subsequent compression of the fed-in harvested material by means of the pressing piston a bale growth step is realized; wherein sensing means determine the bale growth for each feed stroke; and wherein an electronic evaluation device acquires the sensing values of the bale growth for each feed stroke and converts the sensing values into an average operand and/or statistical operand; wherein the electronic evaluation device, based on the average operand and/or statistical operand and at least the value of the preset nominal length of the bale calculates based on a selectable algorithm a value for the number of nominal feed strokes; wherein the electronic evaluation device compares the number of actual feed strokes with the number of nominal feed strokes and, upon reaching the number of nominal feed strokes, triggers the tying device.

In a pick-up baler of the aforementioned kind, the picked-up harvested material is collected in a feed channel and pre-compressed until a pressure sensing device has determined a desired degree or filling and a control triggers conveying of the stored harvested material package from the feed channel into a pressing channel by a feed stroke through a pressing channel intake that has been released prior to this by a retainer.

With this advantageous method of filling the pressing channel, an optimal and uniform bale density and bale shape are provided. Independent of the swath size, the travel speed or other parameters, the harvested material package that is supplied to the pressing channel for an adjusted setting is always uniform and, in this way, the bale growth for each feed stroke is also uniform. This advantage is used in the device of the present invention and the method of the present invention for determining and controlling the bale length in order to obtain therewith a bale length that is as precise and uniform as possible. A precise determination and control of the adjusted bale length is achieved because each bale growth is precisely measured, the resulting values are averaged over a certain number, and, based on this, the number of the required feed strokes for achieving the nominal bale length is calculated.

It is particularly advantageous that all bale growth values of a bale are actually measured. In contrast to other known solutions, no theoretical value is used in the calculation.

BRIEF DESCRIPTION OF DRAWINGS

FIG. 1 shows schematically a pick-up baler according to the present invention provided with a sensor, an electronic evaluation device, and an operating unit.

DETAILED DESCRIPTION

The pick-up baler 1 illustrated schematically in the only drawing FIG. 1 is supported by wheels 2 on the ground and can be connected by means of a draw-bar or hitch 4 to an agricultural tractor, not illustrated. The traveling direction is indicated by an arrow 5. The pick-up baler 1 can also be designed as a self-propelled agricultural machine having its own drive. The drive of the illustrated embodiment is realized by means of the power take-off shaft of the tractor vehicle via a cardan shaft (universal joint shaft) onto the input coupling or clutch 6 and is transmitted from there by means of the main gearbox 7 and the crank gear 8 onto the pressing piston 9 that moves in a reciprocating fashion approximately horizontally in the longitudinal direction of the pick-up baler 1 within the pressing channel 10 so that the harvested material 13 supplied via the pressing channel intake 11 from the feed channel 12 is compacted to a bale 14 that is subsequently tied by means of a tying device 15 with baler twine.

By means of the main gear box 7, the rotary conveyor 16 is also driven in rotation in the direction of the arrow. The illustrated rotary conveyor 16 has six rakes; five of the rakes are configured as simple conveying rakes 17. They convey the harvested material, for example, straw, hay, or wilted green fodder, picked up from the ground 3 by the pickup device 18, into the feed channel 12. The sixth rake serves moreover as a feeding rake 19 for conveying the harvested material 13 from the feed channel 12 through the pressing channel intake 11 into the pressing channel 10. For this purpose, a control curve path (not illustrated) for this feed rake 19 is pivoted, depending on the degree of filling, from a conveying position into a feeding position. The degree of filling of the feed channel 12 is determined by means of a retainer 20 that is arranged underneath the pressing channel intake 11 and is connected to a pressure sensing device. Upon reaching a preselected degree of filling, the retainer 20 opens the pressing channel intake 11 so that the feed stroke of the feed rake 19 can be carried out. A synchronizing device ensures synchronization of the feed movement of the feed rake 19 and of the movement of the pressing piston 9. The conveying stroke therefore can be carried out only when the pressing piston 9 releases the pressing channel intake 11.

Otherwise, the retainer 20 prevents an uncontrolled penetration of harvested material from the feed channel 12 into the pressing channel 10 and vice versa In this way, it is ensured that always the same preselected amount of harvested material 13 for each feed stroke is supplied to the pressing channel 10. With this uniform harvested material supply into the pressing channel 10, the pick-up baler 1 according to the invention generates a bale 14 that is particularly uniform with regard to density and shape. In the described embodiment of bale length determination, a sensor including a thumb wheel (starwheel) 21 that positively engages the bale 14 is provided. The thumb wheel (starwheel) 21 is rotated by means of the advancing bale in a direction opposite to the travel direction within the pressing channel 10. Already when doing so, the described uniform density and shape of the bale provides a significant advantage relative to bales that are compressed with conventional pressing devices because the imprecision caused by slip is significantly reduced. The sensor comprises sensing means (movement sensors) of a known configuration that record the rotational movement of the thumb wheel (starwheel) 21. The electronic evaluation device 22 acquires the sensor signals indicating the bale length and computes based on a certain number of measured values of bale growth an averaged or mean value of bale growth for each feed stroke of the harvested material 13 from the feed channel 12 into the pressing channel 10 and the subsequent compression of this quantity of harvested material by means of the pressing piston 9. Based on the averaged value and the value forthe preset nominal bale length, the number of required feed strokes is calculated that is needed for reaching the nominal bale length. It is also conceivable to incorporate into this computation additional parameters or measured values, for example, in regard to properties of the harvested material or machine-related data that can be measured by sensors, respectively. After carrying out the calculated nominal number of feed strokes, tying of the bale by means of the tying process of the tying device 15 that is triggered by the electronic evaluation device 22 is carded out.

The special features of the method according to the invention for determining and controlling a bale length by means of computation based on averaged or mean values, possible outliers of the measured results caused by measuring errors or by possible sensing imprecision when passing from one bale to the next are smoothed and in this way the nominal bale length is achieved even more precisely.

By controlling the bale length by means of the number of feed strokes and accordingly by means of the number of the very exact bale growth steps, after complete emptying of the pressing channel 10 the first bale is already generated in accordance with the preset nominal length. After this first bale has reached the thumb wheel 21 upon corresponding feeding in the longitudinal direction and the first bale growth values are then determined by the electronic evaluation device 22, the feed strokes that have been carried out up to this point for this bale are incorporated into the further computation of the nominal feed strokes. Since after each feed stroke actually a uniform bale growth is realized, this control according to the present invention is already as precise for the first bale as for all further bales. Since in this method now theoretical bale growth values that can actually vary from zero to a maximum are incorporated into the computation, as is the case in prior art methods and devices, it is moreover advantageously possible according to the present method that a minimum length or a maximum length are preset and these values are actually not surpassed or undershot.

Further embodiments of the proposed device for measuring and controlling the bale length are possible; for example, the determination of the bale growth is conceivable also by means of measuring the removed tying twine length between two feed strokes.

Operation of the control can be realized from the tractor by a remote-control operating or control unit 23 that displays the pre-set values and the operating states.

While specific embodiments of the invention have been shown and de Inscribed in detail to illustrate the inventive principles, it will be understood that the invention may be embodied otherwise without departing from such principles.

What is claimed is:

1. A device for determining and controlling a bale length on a pick-up baler for agricultural harvested material, the device comprising:

a pick-up device;

a feed channel connected to the pick-up device;

a pressing channel connected to the feed channel;

a conveying device arranged downstream of the pick-up device for conveying the harvested material through the feed channel into the pressing channel, wherein a conveying action for the harvested material for conveying the harvested material from the feed channel into the pressing channel is carried out by a feed stroke that is controlled based on a degree of filling of the feed channel;

a pressing piston arranged within the pressing channel and movable reciprocatingly for compacting the harvested material by a pressing stroke;

a tying device for tying the finished bale with tying material;

at least one sensor detecting a bale growth resulting by compression of the harvested material conveyed by the feed stroke from the feed channel into the press channel and the subsequent pressing stroke, wherein the at least one sensor measures an actual length change of the bale after completion of the feed stroke and the subsequent pressing stroke of the pressing piston;

an electronic evaluation device connected to the at least one sensor, wherein the at least one sensor supplies the measured actual length change to the electronic evaluation device, wherein the measured actual length change is converted into at least one of an averaged operand and a statistical operand for determining a required number of the feed strokes for approximately reaching a preset nominal bale length, wherein, after completion of the computed nominal number of feed strokes, the binding tying device is triggered.

2. The device according to claim 1. further comprising a remote-control operating unit for presetting the nominal bale length.

3. The device according to claim 1, wherein the at least one sensor comprises a starwheel contacting the bale and is adapted to record rotational movement of the starwheel.

4. The device according to claim 1, wherein the at least one sensor is configured to measure the bale growth indirectly by measuring a length of removed tying material.

5. A method for determining and controlling a bale length on a pick-up baler for agricultural harvested material according to claim 1, the method comprising the steps of:

measuring an actual length change with at least one sensor for, each bale growth step that is defined by completion of a feed stroke moving harvested material from the feed channel into the pressing channel and a subsequent pressing stroke compressing the harvested material;

sending the measured actual length change values of the bale growth steps to an electronic evaluation device;

converting the measured actual length change values of the bale growth steps in the electronic evaluation device into at least one of an averaged operand and a statistical operand;

calculating with a selectable algorithm a number of nominal feed strokes in the electronic evaluation device based on the at least one averaged operand and statistical operand and at least a pre-selected nominal bale length;

comparing in the electronic evaluation device the number of actual feed strokes carried out in the bale growth steps with the number of nominal feed strokes and, upon reaching the number of nominal feed strokes, triggering the tying device.

6. The method according to claim 5, wherein the step of calculating is repeated each time the bale growth has been measured.

7. The method according to claim 5, wherein, in the step of calculating, parameters of properties of the harvested material are incorporated.

8. The method according to claim 5, wherein, in the step of calculating, machine data of the device are incorporated.

9. The method according to claim 5, further comprising the steps of staring an initial number of feed strokes canied out after complete emptying of the pressing channel and before a first bale growth is measured and incorporating the initial number of feed strokes in the step of calculating the number of nominal feed strokes.

* * * * *